United States Patent
Wang et al.

(10) Patent No.: US 10,104,583 B2
(45) Date of Patent: Oct. 16, 2018

(54) ADAPTIVE VOLTE HANDOVER MODE BASED ON NETWORK CAPABILITY

(71) Applicant: Samsung Electronics Co., Ltd, Suwon-si (KR)

(72) Inventors: Shu Wang, Allen, TX (US); Niranjan, The Colony, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 15/249,332

(22) Filed: Aug. 26, 2016

(65) Prior Publication Data

US 2018/0063754 A1   Mar. 1, 2018

(51) Int. Cl.
*H04W 36/00* (2009.01)
*H04W 24/10* (2009.01)
*H04W 36/30* (2009.01)
*H04W 36/36* (2009.01)

(52) U.S. Cl.
CPC ....... *H04W 36/0022* (2013.01); *H04W 24/10* (2013.01); *H04W 36/30* (2013.01); *H04W 36/36* (2013.01)

(58) Field of Classification Search
CPC . H04W 28/00; H04W 36/0055; H04W 36/14; H04W 36/0066; H04W 36/0083; H04W 36/00
USPC ........... 455/436, 437, 438, 439, 440, 550.1, 455/552.1, 553.1
See application file for complete search history.

(56) References Cited

U.S. PATENT DOCUMENTS

| | | | | |
|---|---|---|---|---|
| 2014/0162661 A1* | 6/2014 | Shaw | ............. | H04W 36/22 455/439 |
| 2015/0078337 A1* | 3/2015 | Kim | ............. | H04L 65/1083 370/331 |
| 2015/0131619 A1* | 5/2015 | Zhu | ............. | H04W 36/0022 370/332 |
| 2015/0282013 A1* | 10/2015 | Kim | ............. | H04L 65/1069 370/331 |
| 2015/0358477 A1* | 12/2015 | Jeong | ............. | H04M 15/56 370/259 |

(Continued)

OTHER PUBLICATIONS

3GPP TS 36.331 V12.4.0 (Dec. 2014) Technical Specification 3rd Generation Partnership Project; Technical Specification Group Radio Access Network; Evolved Universal Terrestrial Radio Access (E-UTRA); Radio Resource Control (RRC); Protocol specification (Release 12); Dec. 2014—410 Pages.

(Continued)

*Primary Examiner* — Jean Gelin

(57) ABSTRACT

A method of operating user equipment (UE) for detecting network capability. The method comprises identifying a preferred mode for a voice over long-term evolution (VoLTE) call handover operation from an LTE network to a non-LTE network in a first communication network. The preferred mode is associated with the first communication network. The method further comprises initiating a VoLTE call in a second communication network different than the first communication network, determining whether the second communication network is capable of supporting the preferred mode associated with the first communication network, and one of changing and maintaining the preferred mode based on a result of the determination.

17 Claims, 8 Drawing Sheets

(56) References Cited

U.S. PATENT DOCUMENTS

| | | | |
|---|---|---|---|
| 2016/0095151 A1* | 3/2016 | Chuttani | H04L 65/40 |
| | | | 370/329 |
| 2016/0119858 A1* | 4/2016 | Liu | H04W 48/16 |
| | | | 455/434 |
| 2016/0234741 A1* | 8/2016 | Nakajima | H04W 36/0055 |
| 2016/0330655 A1* | 11/2016 | Vashi | H04W 36/0022 |
| 2016/0366627 A1* | 12/2016 | Yang | H04W 36/14 |
| 2016/0373944 A1* | 12/2016 | Jain | H04L 43/50 |
| 2017/0034757 A1* | 2/2017 | Yang | H04W 36/30 |
| 2017/0094574 A1* | 3/2017 | Singh | H04W 36/0022 |
| 2017/0180429 A1* | 6/2017 | Osterlund | H04L 65/1006 |
| 2017/0201911 A1* | 7/2017 | Ng | H04W 36/0022 |

OTHER PUBLICATIONS

3GPP2 C.S0005-0 Version 1.0; 3rd Generation Partnership Project; "Upper Layer (Layer 3) Signaling Standard for cdma2000 Spread Spectrum Systems"; Date: Jul. 1999—1153 Pages.

ETSI TS 136 211 v12.5.0 (Apr. 2015) LTE; Evolved Universal Radio Access (E-UTRA); Physical channels and modulation (3GPP TS 36.211 version 12.5.0 Release 12)—Apr. 2015—139 Pages.

* cited by examiner

ADAPTIVE VOLTE HANDOVER MODE BASED ON NETWORK CAPABILITY

TECHNICAL FIELD

This disclosure relates generally to wireless communication systems. More specifically, this disclosure relates to an adaptive VoLTE handover mode based on network capability.

BACKGROUND

The rapid development of long term evolution (LTE) network opens up new opportunities to both mobile carriers and device original equipment manufacturers (OEMs). Due to higher throughput, lower latency and faster connection times, many new applications related to the LTE network have emerged. For example, voice over LTE (VoLTE) technique which transmits higher quality voice calls through an LTE network provides the salient advantages such as higher efficiency and robust global roaming. As the LTE networks are being continually deployed, the capability of mobile devices to perform seamlessly handover of VoLTE calls to non-LTE networks (e.g., circuit switched (CS) networks or WiFi network) will be a key technology for higher quality voice call experience to mobile users. Therefore, an efficient and seamless handover technique between the LTE and non-LTE networks is needed to improve VoLTE call performances and throughput.

SUMMARY

This disclosure provides an adaptive VoLTE handover mode based on network capability.

In one embodiment, a user equipment (UE) for detecting network capability is provided. The UE includes a memory and at least one processor operably connected to the memory. The at least one processor is configured to identify a preferred mode for a voice over long-term evolution (VoLTE) call handover operation from an LTE network to a non-LTE network in a first communication network. The preferred mode is associated with the first communication network. The at least one processor is further configured to initiate a VoLTE call in a second communication network different than the first communication network, determine whether the second communication network is capable of supporting the preferred mode associated with the first communication network, and change or maintain the preferred mode based on a result of the determination.

In another embodiment, a method of operating user equipment (UE) for detecting network capability is provided. The method includes identifying a preferred mode for a voice over long-term evolution (VoLTE) call handover operation from an LTE network to a non-LTE network in a first communication network. The preferred mode is associated with the first communication network. The method further includes initiating a VoLTE call in a second communication network different than the first communication network, determining whether the second communication network is capable of supporting the preferred mode associated with the first communication network, and one of changing and maintaining the preferred mode based on a result of the determination.

In yet another embodiment, a non-transitory computer readable medium is provided. The non-transitory readable medium includes program code, that when executed by at least one processor, causes the at least one processor to identify a preferred mode for a voice over long-term evolution (VoLTE) call handover operation from an LTE network to a non-LTE network in a first communication network. The preferred mode is associated with the first communication network. The non-transitory readable medium further includes program code, that when executed by at least one processor, causes the at least one processor to initiate a VoLTE call in a second communication network different than the first communication network, determine whether the second communication network is capable of supporting the preferred mode associated with the first communication network, and change or maintain the preferred mode based on a result of the determination.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 10, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

The descriptions of FIGS. 1-4 are not meant to imply physical or architectural limitations to the manner in which different embodiments may be implemented. Different embodiments of the present disclosure may be implemented in any suitably-arranged communications system.

Figure 1:
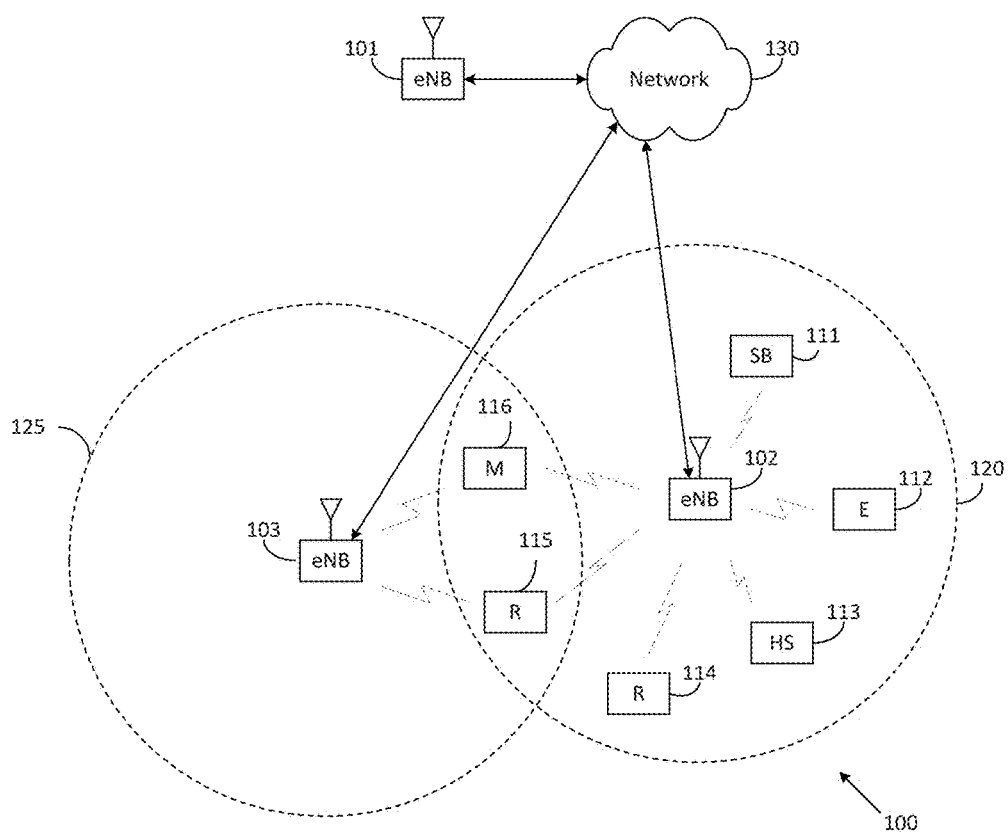
FIG. 1 illustrates an example wireless network according to embodiments of the present disclosure.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, LTE-U (LAA), circuit switched networks (UMTS, GSM) or other wireless communication techniques.

In some embodiments, UEs 116, 115 may perform a handover operation (e.g., VoLTE call) between base stations 102, 103 (e.g., the eNB 102, eNB 103). In one embodiment, the eNB 102 (e.g., base station 102) and the eNB 103 (e.g., base station 103) are homogeneous network each other. For example, the eNB 102 and the eNB 103 communicate with the UEs 115, 116 using an LTE communication protocol provided by an LTE network. In another embodiment, the eNB 102 (e.g., base station 102) and the eNB 103 (e.g., base station 103) are heterogeneous network each other. For example, the eNB 102 communicates with the UEs 115, 116 using an LTE communication protocol provided by an LTE network. The eNB 103 communicates with the UEs 115, 116 using a non-LTE communication protocol provided by a non-LTE network (e.g., circuit switched network, WiFi network).

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for transmitting a context of VoLTE call. In certain embodiments, and one or more of the eNBs 101-103 includes circuitry, programming, or a combination thereof, for processing of detecting network capability and providing a VoLTE call handover from a LTE network to a non-LTE network.

In some embodiments, the UEs 111-116 may detect network capability. For example, the UEs 111-116 may identify a preferred mode that is configured at the UEs 111-116 (such as using a hard coded or manually) for a voice over long-term evolution (VoLTE) call handover operation from an LTE network to a non-LTE network in a first communication network. The preferred mode is associated with the first communication network. The UEs 111-116 may initiate a VoLTE call in a second communication network different than the first communication network. The UEs 111-116 may determine whether the second communication network is capable of supporting the preferred mode associated with the first communication network. And the UEs 111-116 may change and/or maintain the preferred mode based on a result of the determination.

In some embodiments, the UEs 111-116 may determine whether the second communication network is capable of supporting the preferred mode. In such embodiments, the UEs 111-116 measure signal strength of the second communication network and transmits, to the second communication network, a predicted measurement report based on the measured signal strength of the second communication network for triggering a VoLTE call handover operation to a non-LTE network. In addition, the UEs 111-116 may receive, from the second communication network, a response message corresponding to the predicted measurement report. The response message indicates whether the second communication network is capable of supporting the preferred mode associated with the first communication network.

In some embodiments, the UEs 111-116 may determine whether the second communication network is capable of supporting the preferred mode. In such embodiments, the UEs 111-116 may configure at least one threshold for a VoLTE call handover operation from the LTE network to the non-LTE network and adaptively adjusts the at least one threshold in response to a response message indicating a network capability of the second communication network.

In some embodiments, the UEs 111-116 may determine whether a second communication network is capable of supporting a preferred mode. In such embodiments, the UEs 111-116 may compare measured signal strength of the second communication network with at least one threshold when a network capability of the second communication network supports a preferred mode for a VoLTE call handover operation and maintain the preferred mode based on the network capability of the second communication network.

In some embodiments, the UEs 111-116 may change and/or maintain a preferred mode based on a result of the determination. In such embodiments, the UEs 111-116 may change the preferred mode in advance of needing to perform a VoLTE call handover in response to a response message indicating a network capability of a second communication network and maintain the preferred mode in advance if needing to perform the VoLTE call handover in response to a response message indication the network capability of the second communication network. In such embodiments, the preferred mode is at least one of a function of single radio voice call continuity (SRVCC) or an enhanced packet data gateway (ePDG) for the VoLTE call handover operation.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

Figure 2:
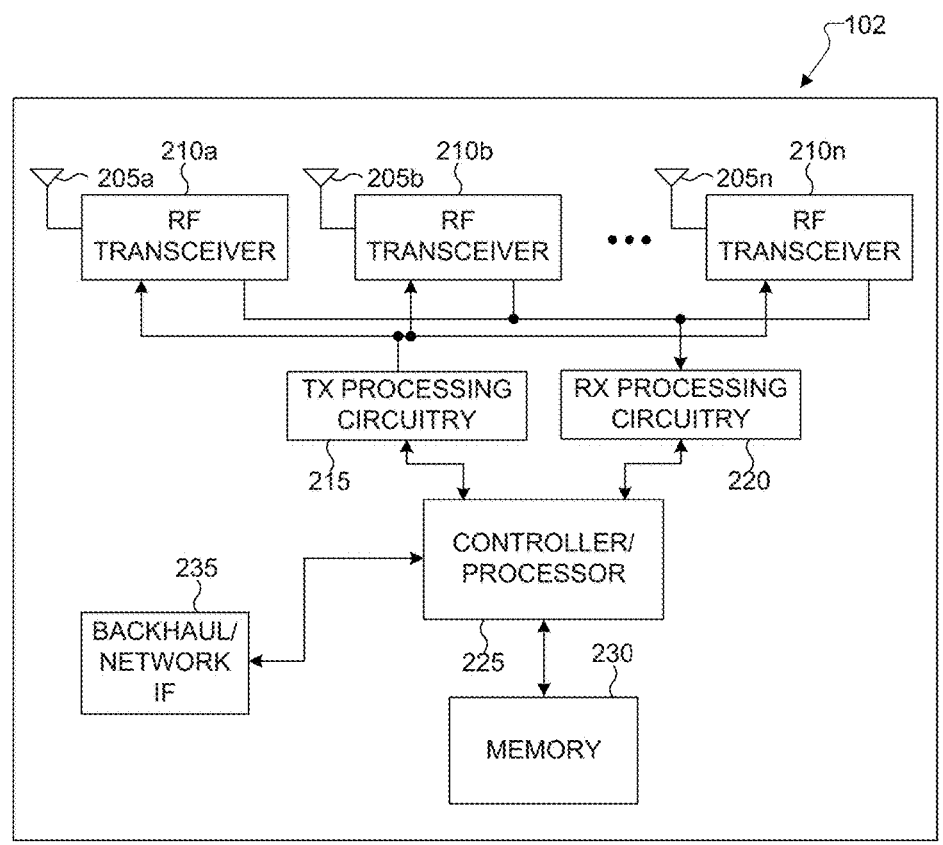
FIG. 2 illustrates an example eNodeB (eNB) according to embodiments of the present disclosure.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

In some embodiments, the eNB 102 (e.g., such as base station) communicates with UEs (such as mobile devices) belonging to the eNB's network using an LTE communication protocol specified in the LTE system specification. In such embodiments, the eNB control an LTE network. In some embodiments, the eNB 102 (such as base station) communicates with UEs (such as mobile devices) belonging to the eNB's network using a non-LTE communication protocol (such as circuit switched network, WiFi network).

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

In some embodiments, the RF transceiver 210a-210n is configured to transmit, to a second communication network, a predicted measurement report based on measured signal strength of second communication network for triggering a VoLTE call handover operation to a non-LTE network and receive, from the second communication network, a response message corresponding to the predicted measurement report, wherein the response message indicates whether the second communication network is capable of supporting the preferred mode associated with the first communication network.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller.

As described in more detail below, the eNB 102 includes circuitry, programing, or a combination thereof for supporting an adaptive VoLTE call handover mode based on network capability.

For example, controller/processor 225 can be configured to execute one or more instructions, stored in memory 230, that are configured to cause the controller/processor to support an adaptive VoLTE call handover mode based on network capability.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, LTE-A, or LTE-U (LAA)), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM. In some embodiments, the memory 230 may store a program code, that when executed by at least one controller/processor 410, causes the at least one processor to receive a measurement report from a UE for performing a VoLTE call handover from a LTE network to a non-LTE network.

In such embodiment, the memory 230 may store a program code, that when executed by at least one controller/processor 410, cause the at least one processor to generate a response message corresponding to a predicted measurement report received from UEs 111-116 for performing a VoLTE call handover from a LTE network to a non-LTE network. More specifically, the response message corresponding to the predicted measurement report indicates whether the second communication network is capable of supporting the preferred mode associated with the first communication network.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
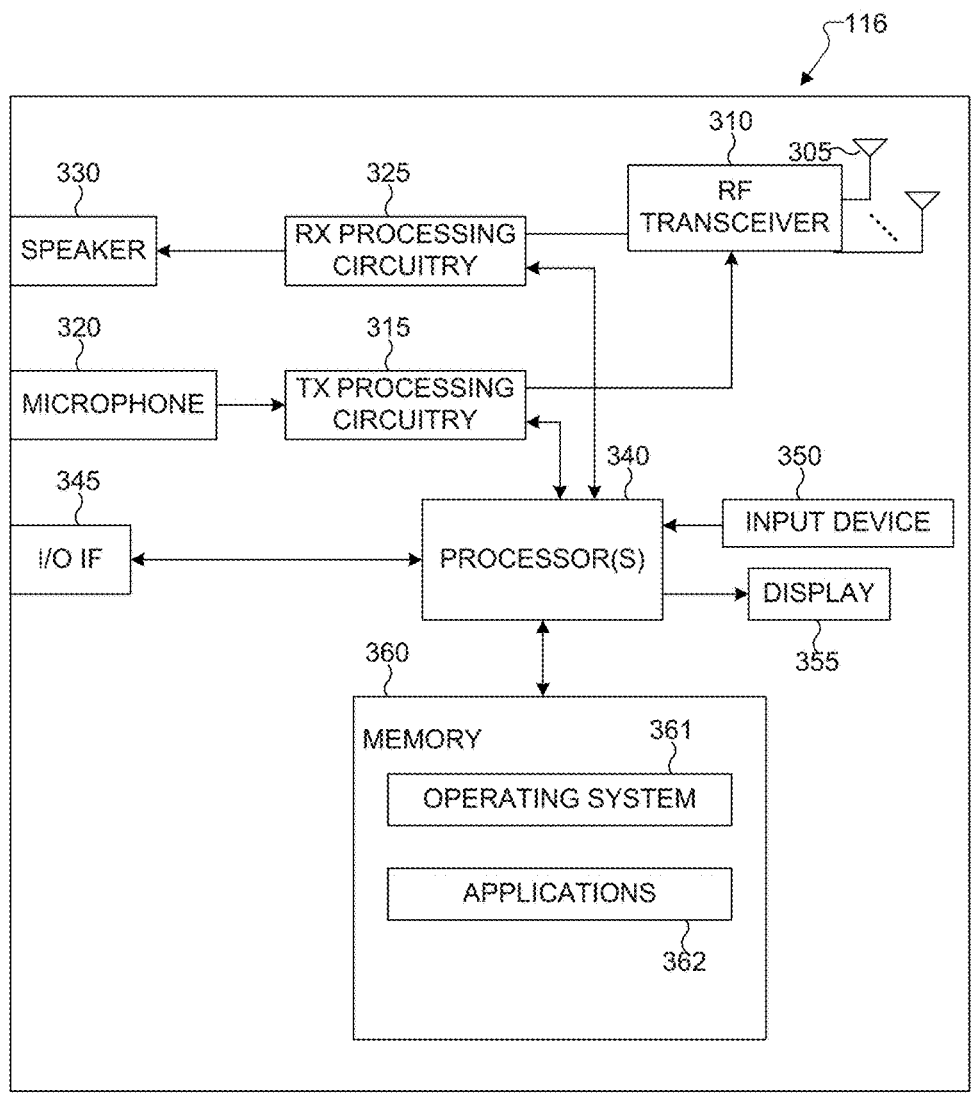
FIG. 3 illustrates an example user equipment (UE) according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes a set of antennas 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the set of antennas 305, an incoming RF signal transmitted by an eNB of the network 100. The RF transceiver 310 down-converts the incoming RF signal to generate an intermediate frequency (IF) or baseband signal.

The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes an adaptive VoLTE call handover based on network capability.

The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350 and the display 355. The operator of the UE 116 can use the input device 350 to enter data into the UE 116. The display 355 may be a liquid crystal display, light emitting diode display, or other display capable of rendering text and/or at least limited graphics, such as from web sites. In some embodiments, the processor 340 may detect network capability. For example, the processor 340 may identify a preferred mode that is configured at the UEs 111-116 (such as using a hard coded or manually) for a voice over long-term evolution (VoLTE) call handover operation from an LTE network to a non-LTE network in a first communication network. The preferred mode is associated with the first communication network. The processor 340 may initiate a VoLTE call in a second communication network different than the first communication network. The processor 340 may determine whether the second communication network is capable of supporting the preferred mode associated with the first communication network. And the processor 340 may change and/or maintain the preferred mode based on a result of the determination.

In some embodiments, the processor 340 may determine whether the second communication network is capable of supporting the preferred mode. In such embodiments, the processor 340 measures a signal strength of downlink signal received from the second communication network and transmits, to the second communication network, a predicted measurement report based on the measured signal strength of downlink signal for triggering a VoLTE call handover operation to a non-LTE network. In addition, the processor 340 may receive, from the second communication network, a response message corresponding to the predicted measurement report. The response message indicates whether the second communication network is capable of supporting the preferred mode associated with the first communication network.

In some embodiments, the processor 340 may determine whether the second communication network is capable of supporting the preferred mode. In such embodiments, the processor 340 may configure at least one threshold for a VoLTE call handover operation from the LTE network to the non-LTE network and adaptively adjusts the at least one threshold in response to a response message indicating a network capability of the second communication network.

In some embodiments, the processor 340 may determine whether a second communication network is capable of supporting a preferred mode. In such embodiments, the processor 340 may compare measured signal strength of downlink signal received from the second communication network with at least one threshold when a network capability of the second communication network supports a preferred mode for a VoLTE call handover operation and maintain the preferred mode based on the network capability of the second communication network.

In some embodiments, the processor 340 may change and/or maintain a preferred mode based on a result of the determination. In such embodiments, the processor 340 may change the preferred mode in advance of needing to perform a VoLTE call handover in response to a response message indicating a network capability of a second communication network and maintain the preferred mode in advance if needing to perform the VoLTE call handover in response to a response message indication the network capability of the second communication network. In such embodiments, the preferred mode is at least one of a function of single radio voice call continuity (SRVCC) or an enhanced packet data gateway (ePDG) for the VoLTE call handover operation.

In some embodiments, the processor 340 may determine whether a second communication network is capable of supporting a preferred mode. In such embodiments, the processor 340 may compare measured signal strength of downlink signal received from the second communication network with at least one threshold when a network capability of the second communication network support the preferred mode for a VoLTE call handover operation and change the preferred mode with another preferred mode that is different than the preferred mode based on the network capability of the second communication network. In such embodiments, the preferred mode is at least one of a function of SRVCC or an ePDG for the VoLTE call handover operation.

The memory 360 is coupled to the processor 340. Part of the memory 360 could include a random access memory (RAM), and another part of the memory 360 could include a Flash memory or other read-only memory (ROM). In some embodiments, the memory 360 comprising program code, that when executed by at least one processor 240, causes the at least one processor 240 to identify a preferred mode for a voice over long-term evolution (VoLTE) call handover operation from an LTE network to a non-LTE network in a first communication network. The preferred mode is associated with the first communication network.

In some embodiments, the memory 360 further comprising program code, that when executed by at least one processor 240, causes the at least one processor 240 to initiate a VoLTE call in a second communication network different than a first communication network, determine whether the second communication network is capable of supporting a preferred mode associated with the first communication network, and change or maintain the preferred mode based on a result of the determination.

In some embodiments, the memory 360 further comprising program code, that when executed by at least one processor 240, causes the at least one processor 240 to determine whether a second communication network is capable of supporting a preferred mode and measure a signal strength of downlink signal received from the second communication network.

In some embodiments, the memory 360 further comprising program code, that when executed by at least one processor 240, causes the at least one processor 240 to configure at least one threshold for a VoLTE call handover operation from an LTE network to a non-LTE network and adaptively adjust the at least one threshold in response to a response message indicating a network capability of a second communication network.

In some embodiments, the memory 360 further comprising program code, that when executed by at least one processor 240, causes the at least one processor 240 to change a preferred mode in advance of needing to perform a VoLTE call handover in response to a response message indicating the network capability of a second communication network and maintain the preferred mode in advance if needing to perform the VoLTE call handover in response to a response message indication a network capability of the second communication network.

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, only one antenna may be used in set of antennas 305. Also, while FIG. 3 illustrates the UE 116 configured as a mobile telephone or smartphone, UEs could be configured to operate as other types of mobile or stationary devices.

Figure 4:
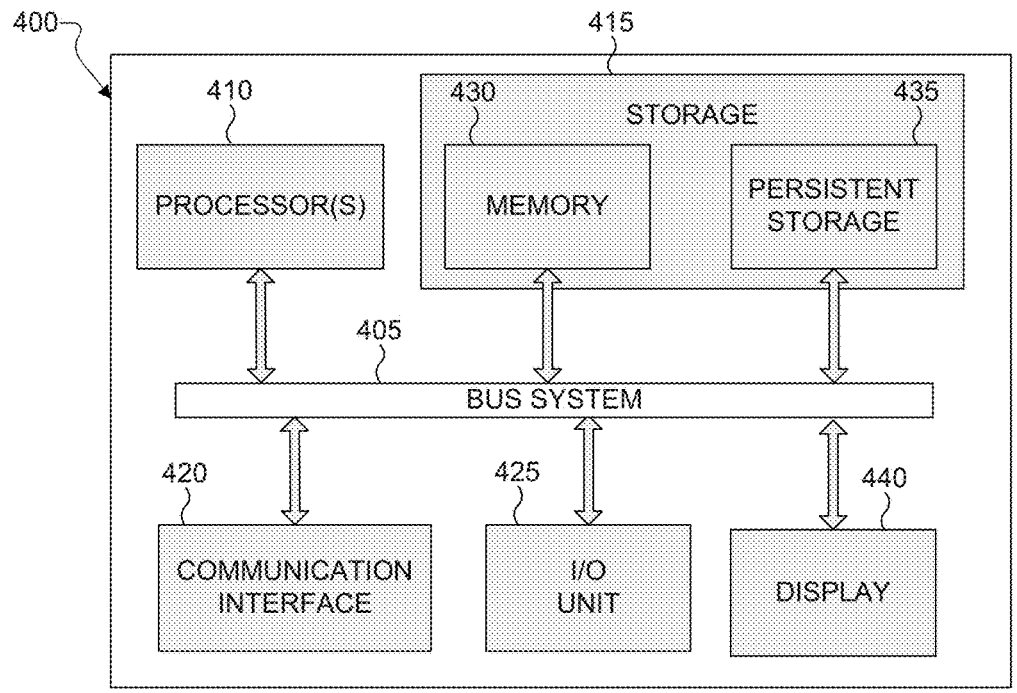
FIG. 4 illustrates an example server in a computing system according to embodiments of the present disclosure.

FIG. 4 illustrates an example server 400 in a computing system according to embodiments of the present disclosure. As illustrated in FIG. 4, the server 400 could represent the eNBs 101, 102, 103 in FIG. 1 or a network entities (such as mobility management entity (MME), serving-gateway (S-GW), mobility switching center (MSC))

In one embodiment, the server 400 could be deployed as an internal that is installed in the eNBs 101, 102, 103. In another embodiment, the server 400 could be deployed as an external device for the eNBs 101, 102, 103, for example, the network entities (such as mobility management entity (MME), serving-gateway (S-GW), and/or mobility switching center (MSC)).

As shown in FIG. 4, the server 400 includes a bus system 405, which supports communication between at least one processor 410, at least one storage 415, at least one communication interface 420, at least one input/output (I/O) unit 425, and at least one display 440.

The processor 410 executes instructions that may be loaded into a memory 430. The processor 410 may include any suitable number(s) and type(s) of processors or other devices in any suitable arrangement. Example types of the processor 410 include microprocessors, microcontrollers, digital signal processors, field programmable gate arrays, application specific integrated circuits, discreet circuitry, and video stream processors.

The memory 430 and a persistent storage 435 are examples of storage devices 415, which represent any structure(s) capable of storing and facilitating retrieval of information (such as data, program code, and/or other suitable information on a temporary or permanent basis). The memory 430 may represent a random access memory or any other suitable volatile or non-volatile storage device(s). The persistent storage 435 may contain one or more components or devices supporting longer-term storage of data, such as a ready only memory, hard drive, flash memory, or optical disc. The display 440 may include a panel, a hologram device, or a projector to display any object (such as a text, a video, an image, a graphic and/or other suitable information).

The communication interface 420 supports communications with other systems or devices. For example, the communication interface 420 could include a network interface card or a wireless transceiver facilitating communications over the network 100. The communication interface 420 may support communications through any suitable physical or wireless communication link(s).

The I/O unit 425 allows for input and output of data. For example, the I/O unit 425 may provide a connection for user input through a keyboard, mouse, keypad, touchscreen, or other suitable input device. The I/O unit 425 may also send output to a display, printer, or other suitable output device.

Note that while FIG. 4 is described as representing the server 400 of FIG. 4, the same or similar structure could be used in one or more of the client devices 111-116 as illustrated in FIG. 1. For example, a laptop or desktop computer could have the same or similar structure as that shown in FIG. 4. Any of these types of devices may implement the above discussed features of the server 400.

The rapid development of an LTE network brings opportunities to both mobile carriers and device OEMs. Due to higher data throughput and lower latency of the LTE network, many new technologies related to the LTE network have emerged. Specifically, transmitting voice calls through the LTE network provides salient advantages such as a higher efficiency and robust global roaming.

As LTE networks are continuing to be deployed, the ability for mobile devices to seamlessly handover voice over long term evolution (VoLTE) call to none-LIE network including other legacy circuit switched (CS) networks (such as GERAN/UTRAN/1×RTT) or WiFi network may be a key technology to provide the best possible voice experience to mobile users. Currently there are two main options for a seamless handover of an active VoLTE call when LIE network is out of coverage.

Figure 5:
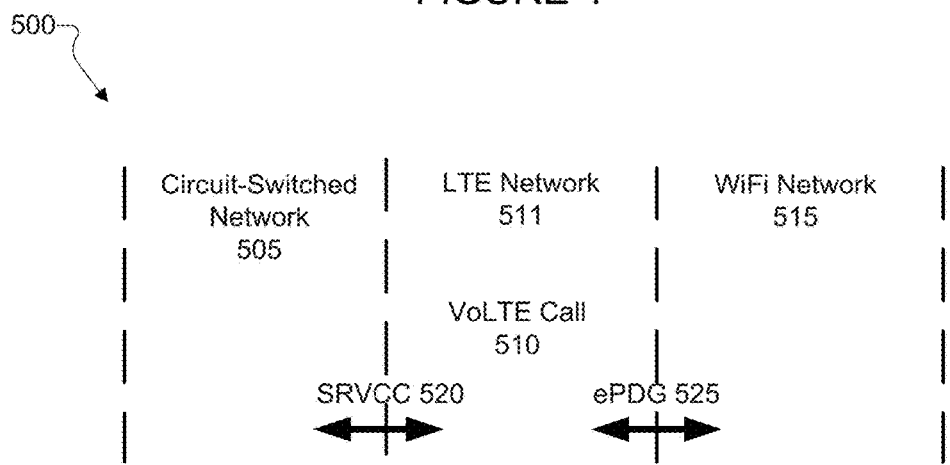
FIG. 5 illustrates an example seamless handover operation for a VoLTE call according to embodiments of the present disclosure.

FIG. 5 illustrates an example seamless handover operation 500 for a VoLTE call according to embodiments of the present disclosure. The embodiment of the seamless handover operation 500 for the VoLTE call illustrated in FIG. 5 is for illustration only, and the seamless handover operation 500 for the VoLTE call of FIG. 5 could have the same or similar configuration. However, the seamless handover operation 500 for the VoLTE call comes in a wide variety of configurations, and FIG. 5 does not limit the scope of this disclosure to any particular implementation of the seamless handover operation for the VoLTE call.

As shown in FIG. 5, the seamless handover operation 500 comprises a circuit switched (CS) network 505, a VoLTE call 510 operating on an LTE network 511, and a WiFi network 515. As shown in FIG. 5, the VoLTE call 510 is switched (such as handover) between the LTE network 511 and non-LTE networks, 505, 515 (such as the CS network 505 and the WiFi network 515). More specifically, when the VoLTE call 510 is handed-over to the CS network 505 from the LTE network 511, single radio voice call continuity (SRVCC) functionality is used for handing over the VoLTE call 510. Similarly, when the VoLTE call 510 is handed-over to the WiFi network 515 from the LTE network 511, evolved packet data gateway (ePDG) functionality is used for handing over the VoLTE call 510.

In some embodiments, a SRVCC allows a VoLTE call 510 to be seamlessly moved from an LTE network 511 to a CS network 505 voice domain (such as global system for mobile communication/universal mobile telecommunication system/code division multiple access 1× (GSM/UMTS/CDMA 1×) 505 when the LTE network 511 is out of coverage. In such embodiments, the SRVCC 520 based VoLTE handover to CS network 505 is triggered.

For example, a handover using the SRVCC 520 is only triggered when a UE has an active VoLTE call 510. As the UE with the active VoLTE call 510 determines that the VoLTE call 510 is moving away from the LTE network 511 coverage (such as an LTE signal less than a network configured SRVCC handover threshold), the UE sends a measurement report to the LTE network 511. Based on the measurement report sent by the UE, the LIE network 511 (e.g., eNB) makes a handover decision and determines that the VoLTE call 510 needs to be moved to the legacy CS network 505. Once the handover decision (from the LTE network 511 to the CS network 505) is made, the eNB of the LTE network 510 sends signals to the UE to instruct the UE to perform a handover.

In some embodiments, the ePDG 525 is used for a seamless handover of the VoLTE call 510 from the LTE network 511 to the WiFi network 515 (or vice versa) based on WiFi offload functionality. Currently, the main driver for deploying voice and video calling over the WiFi network 515 is to extend the reach of VoLTE call 510 services in situations where there are gaps in cellular network coverages. In such embodiment, the ePDG node 525 acts as a gateway between a public network and the rest of the operator's evolved packet core (EPC). When a handover takes place between the LTE network 511 and the WiFi network 515 including the ePDG 525, a device (such as UE) retains the device's internet protocol (IP) address, and any policies assigned to a connection communication with the device may remain intact. In such situation, a handover of the VoLTE call 510 between the VoLTE network 511 and the WiFi network 515 is seamless and transparent to the UE (such as mobile users).

Currently, UE is implemented with hard-coded handover options based on an operator policy, or give users an option to manually choose between WiFi preferred or cellular preferred operation modes. In some embodiments such as a cellular preferred (such as SRVCC preferred), the cellular network has a higher priority than the WiFi network. If the cellular network (e.g. UMTS, GSM, or CDMA 1x) is available, the UE may handover a VoLTE call to CS network via the SRVCC even if the WiFi network is available. In some embodiments, such as in a WiFi network preferred (such as ePDG preferred), the WiFi network has a higher priority than a cellular network, If the WiFi network is available, a UE may handover a VoLTE call to the WiFi network via the ePDG even if a cellular network (e.g., UMTS, GSM, or CDMA 1x) is available.

However, with a hard-coded or manually selected handover policy, VoLTE call handovers are not optimized due to a lack of considerations of network capability. For example, operator's networks support various capabilities (e.g. SRVCC only, ePDG only, or SRVCC+ePDG). More and more phones are going with global support. With the hard-coded handover policy, VoLTE call handovers need to be optimized.

In one example, if a UE has an active VoLTE call and a LTE network (such as serving network) is out of coverage, the UE may first try to a handover the active VoLTE call to non-LTE network such as a UTRAN using a SRVCC if the UTRAN is available. Since the UTRAN does not support the SRVCC capability, the SRVCC handover may fail and the UE may have interrupted the voice call (such as VoLTE call), that is very user-unfriendly.

In another example, if a UE is connected with a WiFi network access point (AP) with a firewall policy and the WiFi AP does not allow an internet key exchange (IKE) traffic pass-through to ePDG server, an ePDG connection may fail. When the UE has an active VoLTE call, and an LTE network is out of coverage and the WiFi network is available, the UE may first try to handover the active VoLTE call to the WiFi network with the ePDG. If the WiFi network does not support the ePDG connection capability, the handover may fail and the UE may have been interrupted the VoLTE call that causes user-unfriendly experience.

In some embodiments, an adaptive VoLTE active call handover mode and a threshold optimization scheme based on a network capability are performed. In such embodiments, a UE dynamically checks a network capability (e.g. SRVCC capability). The UE optimizes VoLTE handover mode selection based on the network capability. For example, if the UE is in a cellular (SRVCC) preferred mode and the network does not support the SRVCC, the UE may adaptively change to a WiFi preferred mode. Whenever the UE moves to a new network that supports an SRVCC, the UE can adaptively change from the WiFi preferred mode back to the cellular preferred mode. In such embodiments, the UE adaptively adjusts handover thresholds between a LTE network and a non-LTE network (e.g., CS and WiFi networks) based on the network capability.

Figure 6:
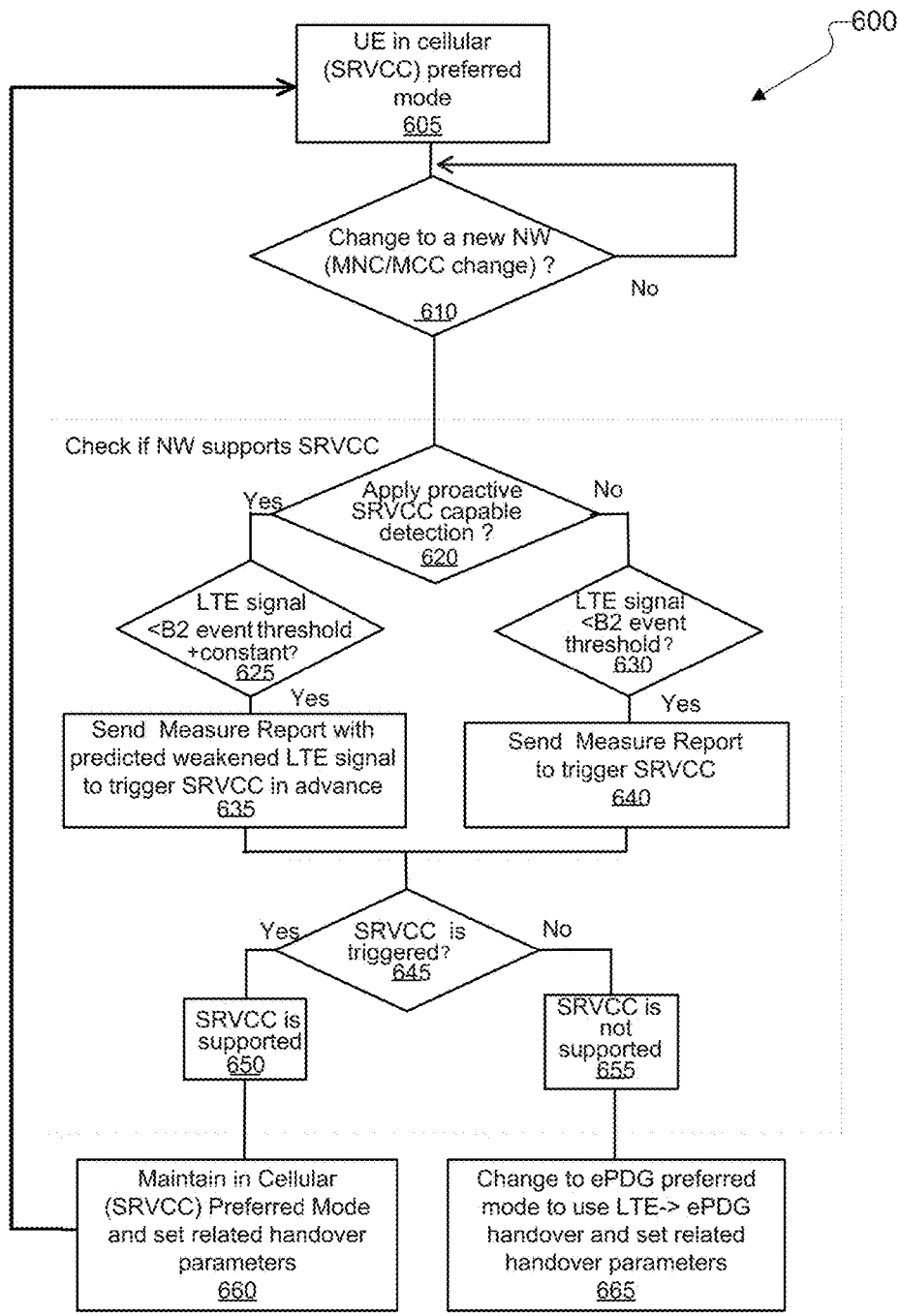
FIG. 6 illustrates a flow chart of an adaptive VoLTE call handover mode based on network capability according to embodiments of the present disclosure.

FIG. 6 illustrates a flow chart of an adaptive VoLTE call handover mode 600 based on network capability according to embodiments of the present disclosure. The embodiment of the flow chart of the adaptive VoLTE call handover mode 600 illustrated in FIG. 6 is for illustration only, and the flow chart of the adaptive VoLTE call handover mode 600 of FIG. 6 could have the same or similar configuration. However, the flow chart of the adaptive VoLTE call handover mode 600 comes in a wide variety of configurations, and FIG. 6 does not limit the scope of this disclosure to any particular implementation of the flow chart of the adaptive VoLTE call handover mode 600.

As shown in FIG. 6, the adaptive VoLTE call handover mode 600 begins at step 605. At step 605, a UE is operating in a cellular preferred mode (e.g., SRVCC preferred mode). At step 610, the UE determines to change a serving network including mobile network code/mobile country code (MNC/MCC) changes. If the UE changed to a new network at step 610, the UE, subsequently, applies a proactive SRVCC capable detection at step 620. If the proactive SRVCC capable detection is applied at step 620, the UE performs a measurement and compares signal strength between an LTE network signal and B2 event threshold+constant value at step 625. Subsequently, the UE sends a measurement report with a predicted weakened LTE signal to trigger the SRVCC in advance at step 635. At step 620, if the UE does not apply the proactive SRVCC capable detection, the UE performs a measurement and compares signal strength of an LTE network signal with B2 event threshold at step 630. Subsequently, the UE sends a measurement report to trigger the SRVCC at step 640 as defined in 3GPP LTE system. At step 645, the UE determined whether the SRVCC is triggered. If the SRVCC is triggered at step 645 and the SRVCC is supported at step 650, the UE maintains the VoLTE call in a cellular preferred mode (such as SRVCC) and set related handover parameters to perform the VoLTE call handover at step 660. If the SRVCC is not triggered at step 645 and the SRVCC is not supported at step 655, the UE changes to ePDG preferred mode (such as WiFi network preferred) to perform VoLTE call handover and set related handover parameters at step 665.

In some embodiments, some thresholds are determined to support a VoLTE call handover to a CS network (such as using SRVCC) or WiFi network (such as using ePDG). In one example, Tsrvcc-lte-to-cs threshold is defined. In such example, a device may send an SRVCC measurement report for triggering a handover from an LTE network to CS network. In another example, Tlte-to-wifi threshold is defined. In such example, a device may trigger a handover from an LTE network to a WiFi network. In yet another example, Tb2-event-theshold-1 and Tb2-event-threshold-2 are defined for an LTE network configured inter-RAT handover B2 event thresholds (e.g. for SRVCC handover thresholds). In such example, when signal strength of an LTE serving cell becomes worse than Tb2-event-theshold-1, and neighboring cells (such as CS) is better than Tb2-eventtheshold-2, the UE sends a measurement report to a network (such as serving network) for a VoLTE call handover from the LTE network to the CS network.

In some embodiments, a UE is initially in a cellular (SRVCC) preferred mode (e.g. user selected) and the UE moves to a new network (e.g. MCC or MNC changes), the UE checks if the new network supports an SRVCC. In some embodiments, to check if the network supports the SRVCC, some handover thresholds are defined for the UE that uses proactive SRVCC capability detection scheme.

While FIG. 6 discusses SRVCC detection, a similar process may be performed for any other type of network preferred handover protocol such as, for example, handover to a WiFi network access point using ePDG, as discussed herein.

Figure 7:
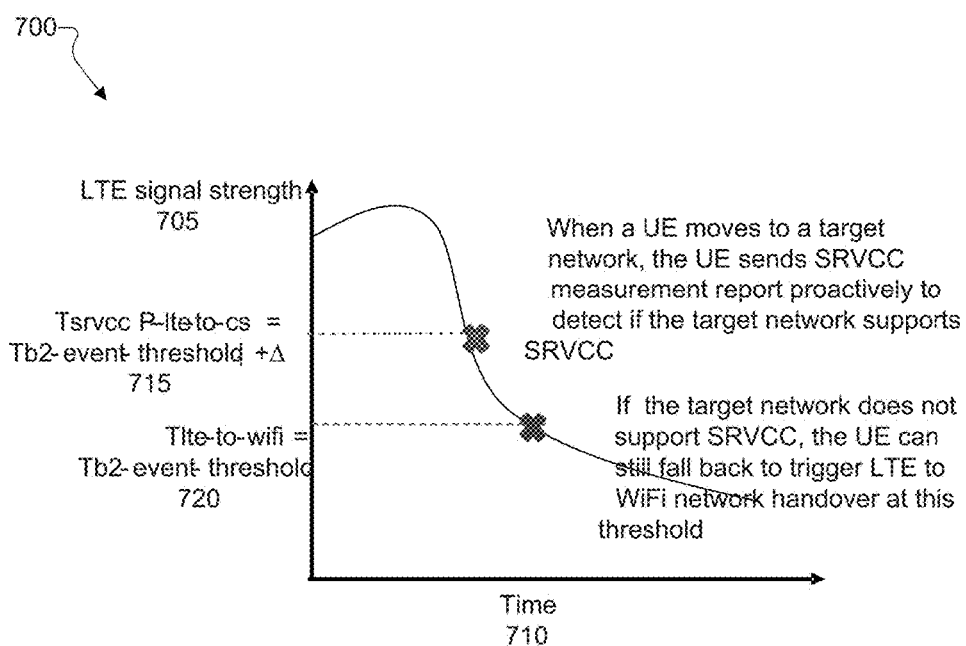
FIG. 7 illustrates an example of threshold configurations to detect network single radio voice call continuity (NW SRVCC) capability without causing call drop or disruption according to embodiments of the present disclosure.

FIG. 7 illustrates an example threshold configuration to detect network single radio voice call continuity (NW SRVCC) capability without causing call drop or disruption according to embodiments of the present disclosure;

The embodiment of the threshold configuration 700 to detect NW SRVCC capability illustrated in FIG. 7 is for illustration only, and the threshold configuration 700 to detect NW SRVCC capability of FIG. 7 could have the same or similar configuration. However, the threshold configuration 700 to detect NW SRVCC capability comes in a wide variety of configurations, and FIG. 7 does not limit the scope of this disclosure to any particular implementation of the threshold configuration 700 to detect NW SRVCC capability.

As shown in FIG. 7, the threshold configuration 700 comprises LTE signal strength 705, a time 710, and a Tsrvcc-lte-to-cs 715, and a Tlte-to-wifi 720. More specifically, Tlte-to-wifi 720 may be set as a Tb2-event-theshold-1 and Tsrvcc-lte-to-cs may be set as a Tb2-event-theshold1+Δ, where Δ is 40 db by default and configurable. The A can be adaptively adjusted based on contexts/past history to allow a UE having enough time to fall back for a handover from LTE network to a WiFi network when an SRVCC handover failure happens.

When the Tsrvcc-lte-to-cs 715 value is greater than Tb2-event-theshold-1 and Tlte-to-wifi 720 value is equal to Tb2-event-theshold-1, a UE first performs a VoLTE call handover from a LTE network to a CS network by using an SRVCC handover proactively for network SRVCC capability detection. If a target network does not support an SRVCC, the SRVCC handover fails and the UE may still have time to fall back to use a WiFi network for the VoLTE call handover.

Figure 8:
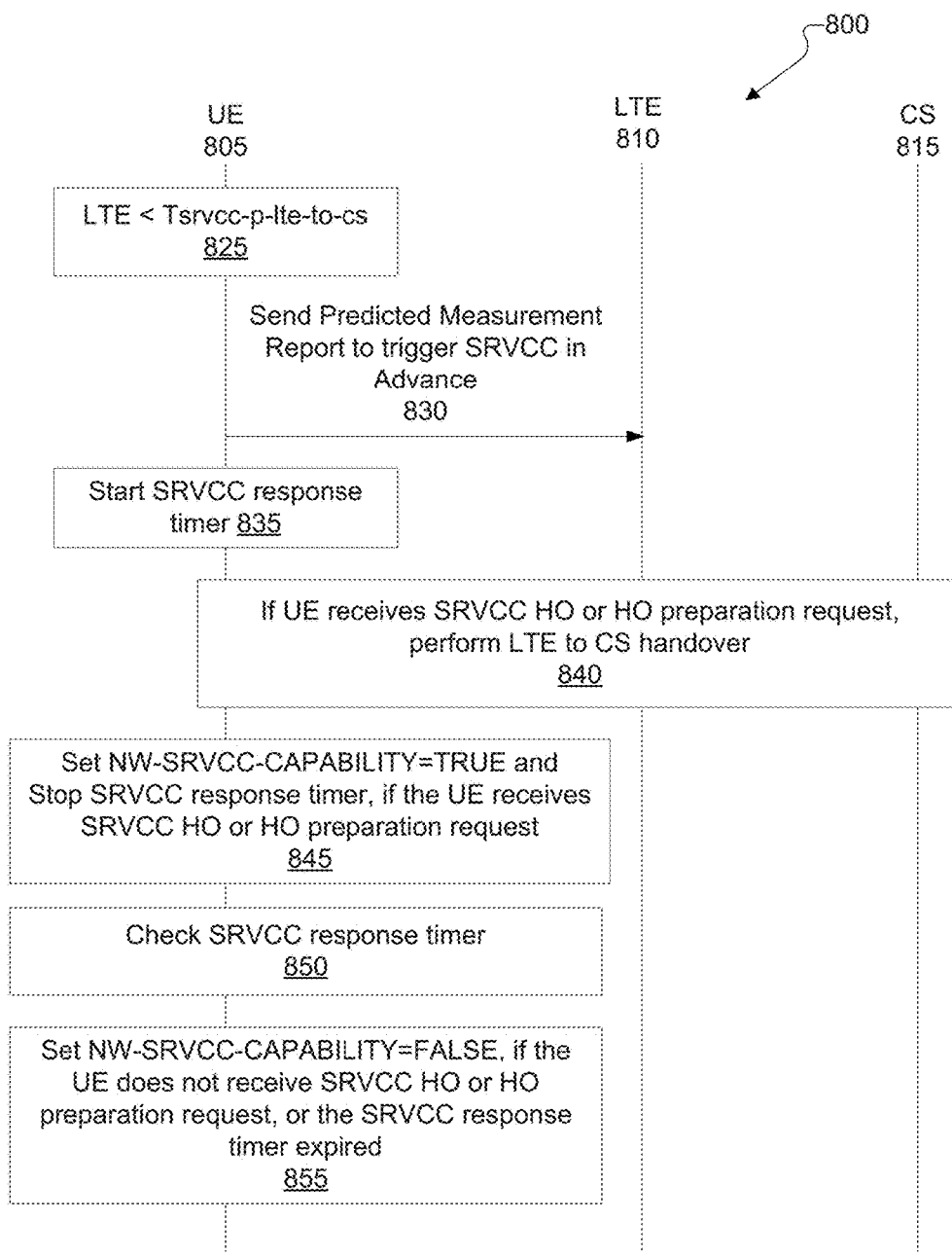
FIG. 8 illustrates an example of signaling call flow for SRVCC capability detection according to embodiments of the present disclosure.

FIG. 8 illustrates an example signaling call flow 800 for single radio voice call continuity (SRVCC) capability detection according to embodiments of the present disclosure. The embodiment of the signaling call flow 800 for SRVCC capability detection illustrated in FIG. 8 is for illustration only, and the signaling call flow 800 for SRVCC capability detection of FIG. 8 could have the same or similar configuration. However, the signaling call flow 800 for SRVCC capability detection comes in a wide variety of configurations, and FIG. 8 does not limit the scope of this disclosure to any particular implementation of signaling call flow 800 SRVCC capability detection.

As shown in FIG. 8, the signaling call flow 800 comprises a UE 805, an LTE network 810, and a CS network 815. The UE 805 measures signal strength from the LTE network and compares the signal strength with a threshold Tsrvcc-lte-to-cs at step 825. The signal strength is lower than the threshold, the UE 805 sends, to the LTE network 810, a predicted measurement report to trigger an SRVCC in advance at step 830. The UE 805 starts SRVCC response timer, at step 835, after sending the predicted measurement report. If the UE 805 receives, at step 840, an SRVCC handover direction message or a handover preparation request message from the LTE network 810, the UE 805 performs a VoLTE call handover to the CS network 815 from the LTE network 810. The UE 805 sets NW-SRVCC-CAPABILITY as TRUE at step 845 and stop SRVCC response timer. If the UE 805 does not receive, at step 840, the SRVCC handover direction message or handover preparation request message from the LTE network 810 or if the SRVCC response timer expires at step 850, the UE 805 sets NW-SRVCC-CAPABILITY as False at step 855.

As shown in FIG. 8, the UE 805 proactively detects NW SRVCC capability based on the Tlte-to-wifi and Tsrvcc-lte-to-cs thresholds values. If the LTE signal is relatively weak (such as the signal strength of the LTE network 810 is lower than the Tsrvcc-lte-to-cs threshold) and the signal strength of the CS network 815 is good enough (such as the signal strength of the CS network 815 is higher than the Tb2-event-threshold-2), the UE 805 sends the predicted measurement report to trigger SRVCC handover proactively. In some embodiments, a predicted measurement report is used to trigger a SRVCC handover in advance. In such embodiments, an LTE signal is set to a current signal-constant value that is less than a B2 event threshold-1.

If an UE does not choose to use the aforementioned proactive SRVCC detection/handover, the UE can trigger SRVCC handover based on conventional LTE system. That is, when LTE signal is reduced to Tb2-event-threshold-1 and CS signal is greater than Tb2-event-threshold-2, The UE triggers SRVCC based on a handover from an LTE network to a CS network at that time. If an SRVCC HO is not triggered, an NW-SRVCC-CAPABILITY is false.

Figure 9:
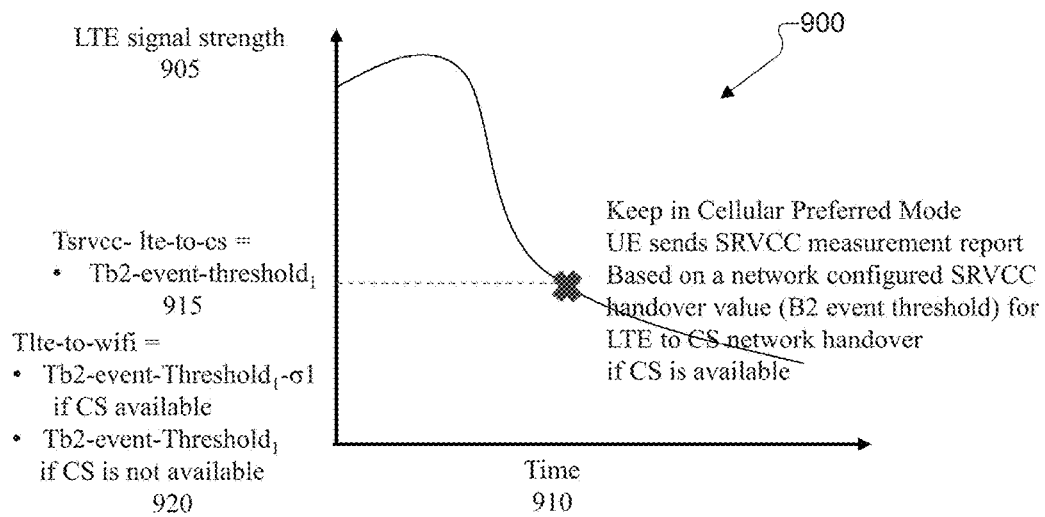
FIG. 9 illustrates an example of threshold configurations when a detected network supports SRVCC capability according to embodiments of the present disclosure.

FIG. 9 illustrates an example threshold configuration 900 when a detected network supports SRVCC capability according to embodiments of the present disclosure. The embodiment of the threshold configuration 900 when the detected network supports the SRVCC illustrated in FIG. 9 is for illustration only, and the threshold configuration 900 when the detected network supports the SRVCC capability of the network of FIG. 9 could have the same or similar configuration. However, the threshold configuration 900 when the detected network supports the SRVCC capability comes in a wide variety of configurations, and FIG. 9 does not limit the scope of this disclosure to any particular implementation of the threshold configuration 900 when the detected network supports the SRVCCC capability.

As shown in FIG. 9, the threshold management 900 comprises LTE signal strength 905, a time 910, and a Tsrvcc-lte-to-cs 915, and a Tlte-to-wifi 920. More specifically, Tsrvcc-lte-to-cs 915 may be set as a Tb2-event-theshold-1 (such as network configured SRVCC handover threshold) and Tlte-to-wifi 920 may be set as a Tb2-event-threshold1-σ1 if a CS network is available or Tb2-event-threshold1 if the CS network is not available. More specifically, after detecting the SRVCC supported capability of the network, a UE stays in a cellular preferred mode and uses the aforementioned thresholds.

Since a target network supports an SRVCC and a UE is in cellular (such as SRVCC) preferred mode, the UE resets the Tsrvcc-lte-to-cs value as the target network configured SRVCC handover threshold (such as Tb2-event-threshold-1).

In some embodiments, a UE sets a Tlte-to-wifi as a Tb2-event-threshold1-σ1 if a CS network is available. It is smaller than the Tsrvcc-lte-to-cs. So the UE may always give an SRVCC handover with a higher priority.

In some embodiments, a UE sets a Tlte-to-wifi as a Tb2-event-threshold-1 if a CS network is not available. In such embodiments, the UE may trigger a handover (such as VoLTE call handover) from an LTE network to a WiFi network when an LTE signal reduces to B2 Event Threshold 1.

Figure 10:
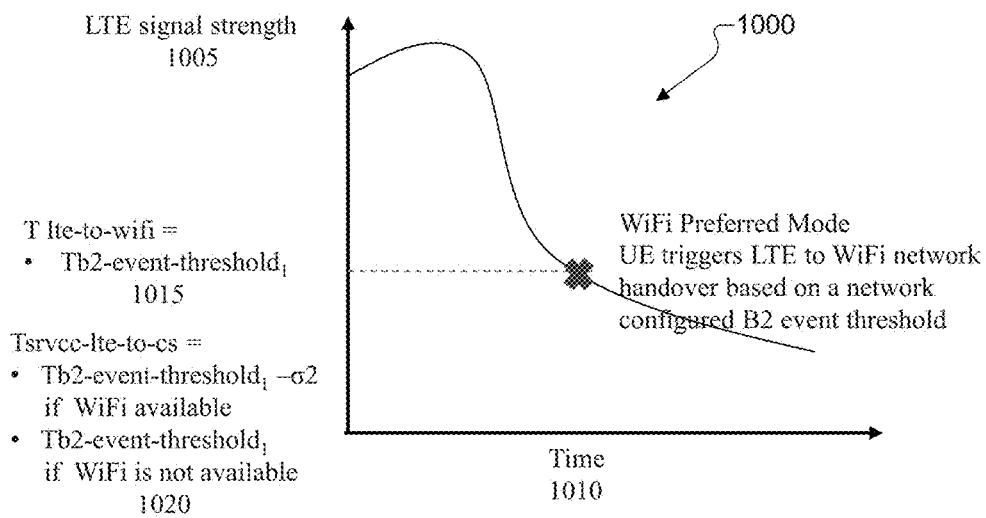
FIG. 10 illustrates an example threshold configuration when a detected network does not support SRVCC capability according to embodiments of the present disclosure.

FIG. 10 illustrates an example threshold configuration 1000 when a detected network does not support SRVCC capability according to embodiments of the present disclosure. The embodiment of the threshold configuration 1000 when the detected network does not support the SRVCC capability illustrated in FIG. 10 is for illustration only, and the threshold configuration 1000 when the detected network does not support the SRVCC capability of FIG. 1000 could have the same or similar configuration. However, the threshold configuration 1000 when the detected network does not support SRVCC capability comes in a wide variety of configurations, and FIG. 10 does not limit the scope of this disclosure to any particular implementation of the threshold management 1000 for the adaptive VoLTE call handover mode.

As shown in FIG. 10, the threshold configuration 1000 comprises LTE signal strength 1005, a time 1010, a Tlte-to-wifi 1015, and a Tsrvcc-lte-to-cs 1020. The Tlte-to-wifi 1015 may be set as a Tb2-event-threshold-1 (such as a network configured handover threshold). The Tsrvcc-lte-to-cs 1020 may be set as a Tb2-event-threshold1-σ2 if a WiFi network is available or a Tb2-event-threshold-1 if the WiFi network is not available. More specifically, a UE stays in or change to a WiFi preferred mode when the detected network does not support the SRVCC capability and uses the aforementioned thresholds.

In some embodiments, a UE sets a Tsrvcc-lte-to-cs 1020 as a Tb2-event-threshold-1-σ2 if a WiFi network is available. It is smaller than the Tlte-to-wifi 1015. Therefore, a WiFi handover is performed with a higher priority.

In some embodiments, a UE sets a Tsrvcc-lte-to-cs 1020 as a Tb2-event-threshold-1 if a WiFi network is not available. Therefore, the UE may trigger a handover (such as VoLTE handover using SRVCC) from an LTE network to a CS network when an LTE signal reduces to B2 Event Threshold 1.

In some embodiments, after the UE detects that a target network does not support SRVCC, the UE can re-check if another target network supports SRVCC capability whenever the UE moves to the other target network. If the other target supports the SRVCC and user prefers the SRVCC, the UE can automatically change back to a cellular preferred mode and adaptively adjusts related handover parameters.

In such embodiments, the UE dynamically detects a target network SRVCC capability. The UE optimizes a VoLTE handover mode selection based on network capability. For example, if the UE is in a cellular (SRVCC) preferred mode and a target network does not support the SRVCC, the UE can adaptively change to a WiFi preferred mode. The UE can also adaptively change from the WiFi preferred mode back to the cellular preferred mode whenever the target network supports the SRVCC. By optimization of such handover polices/modes based on the target network capability, a seamless VoLTE handover may be provided with better user experiences. The UE adaptively adjusts a handover threshold between an LTE network and a CS network using SRVCC, and a handover threshold between an LTE network and a WiFi network using an ePDG based on the network capability.

In some embodiments, a UE sets a SRVCC handover threshold based on a network configured B2 event threshold to allow the UE to choose a detection scheme based on the UE's hardware support (e.g. modem capability)

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A user equipment (UE) for detecting network capability, the UE comprising:
a memory; and
at least one processor operably connected to the memory, the at least one processor configured to:
identify a preferred mode for a voice over long-term evolution (VoLTE) call handover operation from an LTE network to a non-LTE network;
initiate a VoLTE call on the LTE network;
before the VoLTE call handover operation on the VoLTE call, perform a check to determine whether the LTE network and the non-LTE network are capable of supporting the preferred mode;
change or maintain the preferred mode based on a result of the determination wherein the at least one processor is further configured to:
change the preferred mode to another mode in advance of needing to perform the VoLTE call handover operation in response to a response message for the check indicating that the network capability of the LTE network does not support the preferred mode; and
maintain the preferred mode in advance when needing to perform the VoLTE call handover operation in response to a response message for the check indicating that the network capability of the LTE network supports the preferred mode; and
initiate the VoLTE call handover operation to handover the VoLTE call to the non-LTE network based on the preferred mode.

2. The UE of claim 1, wherein:
the preferred mode is a single radio voice call continuity (SRVCC) preferred mode;
the non-LTE network is a circuit switched (CS) network;
the at least one processor is further configured to measure a signal strength of the LTE network and the CS network; and
the UE further comprises a transceiver configured to:
transmit, to the LTE network, a predicted measurement report based on the measured signal strength of the LTE network and the CS network for triggering the VoLTE call handover operation to the CS network, wherein the predicted measurement report is transmitted when the signal strength of the LTE network is equal to threshold plus a delta; and
receive, from the LTE network, a response message corresponding to the predicted measurement report, wherein the response message indicates whether the LTE and CS networks are capable of supporting the SRVCC preferred mode.

3. The UE of claim 1, wherein:
the preferred mode is an enhanced packet data gateway (ePDG) preferred mode;
the non-LTE network is a WiFi network;
the at least one processor is further configured to measure a signal strength of the LTE network and the WiFi network; and
the UE further comprises a transceiver configured to:
   transmit, to the LTE network, a predicted measurement report based on the measured signal strength of the LTE network and the WiFi network for triggering the VoLTE call handover operation to the WiFi network, wherein the predicted measurement report is transmitted when the signal strength of the LTE network is equal to threshold plus a delta; and
   receive, from the LTE network, a response message corresponding to the predicted measurement report, wherein the response message indicates whether the LTE and WiFi networks are capable of supporting the ePDG preferred mode.

4. The UE of claim 2, wherein the at least one processor is further configured to change the SRVCC preferred mode to an enhanced packet data gateway (ePDG) preferred mode that is different than the SRVCC preferred mode based on the network capability of LTE network when the network capability of the LTE network does not support the SRVCC preferred mode for the VoLTE call handover operation.

5. The UE of claim 3, wherein the at least one processor is further configured to change the ePDG preferred mode to a single radio voice call continuity (SRVCC) preferred mode that is different than the ePDG preferred mode based on the network capability of the LTE network when the network capability of the LTE network does not support the ePDG preferred mode for the VoLTE call handover operation.

6. The UE of claim 1, wherein the at least one processor is further configured to:
   configure at least one threshold for the VoLTE call handover operation from the LTE network to the non-LTE network; and
   adaptively adjust the at least one threshold in response to a response message indicating the network capability of the LTE network.

7. A method of operating user equipment (UE) for detecting network capability, the method comprising:
identifying a preferred mode for a voice over long-term evolution (VoLTE) call handover operation from an LTE network to a non-LTE network;
initiating a VoLTE call on the LTE network;
before the VoLTE call handover operation on the VoLTE call, performing a check to determine whether the LTE network and the non-LTE network are capable of supporting the preferred mode;
one of changing and maintaining the preferred mode based on a result of the determination, wherein one of changing and maintaining the preferred mode based on a result of the determination comprises:
   changing the preferred mode to another mode in advance of needing to perform the VoLTE call handover operation in response to a response message for the check indicating that the network capability of the LTE network does not support the preferred mode; and
   maintaining the preferred mode in advance when needing to perform the VoLTE call handover operation in response to a response message for the check indicating that the network capability of the LTE network supports the preferred mode; and
initiating the VoLTE call handover operation to handover the VoLTE call to the non-LTE network based on the preferred mode.

8. The method of claim 7, wherein:
the preferred mode is a single radio voice call continuity (SRVCC) preferred mode;
the non-LTE network is a circuit switched (CS) network; and
performing the check to determine whether the LTE network is capable of supporting the preferred mode comprises:
   measuring a signal strength of the LTE network and the CS network;
   transmitting, to the LTE network, a predicted measurement report based on the measured signal strength of the LTE network and the CS network for triggering the VoLTE call handover operation to the CS network, wherein the predicted measurement report is transmitted when the signal strength of the LTE network is equal to threshold plus a delta; and
   receiving, from the LTE network, a response message corresponding to the predicted measurement report, wherein the response message indicates whether the LTE and CS networks are capable of supporting the SRVCC preferred mode.

9. The method of claim 7, wherein:
the preferred mode is an enhanced packet data gateway (ePDG) preferred mode;
the non-LTE network is a WiFi network; and
performing the check to determine whether the LTE network is capable of supporting the preferred mode comprises:
   measuring a signal strength of the LTE network and WiFi network;
   transmitting, to the LTE network, a predicted measurement report based on the measured signal strength of the LTE network and the WiFi network for triggering the VoLTE call handover operation to the WiFi network, wherein the predicted measurement report is transmitted when the signal strength of the LTE network is equal to threshold plus a delta; and
   receiving, from the LTE network, a response message corresponding to the predicted measurement report, wherein the response message indicates whether the LTE and WiFi networks are capable of supporting the ePDG preferred mode.

10. The method of claim 8, wherein one of changing and maintaining the preferred mode based on the result of the determination comprises changing the SRVCC preferred mode to an enhanced packet data gateway (ePDG) mode based on the network capability of the LTE network when the network capability of the LTE network does not support the SRVCC preferred mode for the VoLTE call handover operation.

11. The method of claim 9, wherein one of changing and maintaining the preferred mode based on the result of the determination comprises changing the ePDG preferred mode to a single radio voice call continuity (SRVCC) preferred mode based on the network capability of the LTE network when the network capability of the LTE network does not support the ePDG preferred mode for the VoLTE call handover operation.

12. The method of claim 7, wherein performing the check to determine whether the LTE network is capable of supporting the preferred mode further comprises:

configuring at least one threshold for the VoLTE call handover operation from the LTE network to the non-LTE network; and adaptively adjusting the at least one threshold in response to a response message indicating the network capability of the LTE network.

13. A non-transitory computer readable medium comprising program code, that when executed by at least one processor, causes the at least one processor to:

identify a preferred mode for a voice over long-term evolution (VoLTE) call handover operation from an LTE network to a non-LTE network;

initiate a VoLTE call on the LTE network;

before the VoLTE call handover operation on the VoLTE call, performing a check to determine whether the LTE network and the non-LTE network are capable of supporting the preferred mode;

change or maintain the preferred mode based on a result of the determination, wherein the program code to change or maintain the preferred mode further comprises program code, that when executed by the at least one processor, causes the at least one processor to:

change the preferred mode to another mode in advance of needing to perform the VoLTE call handover operation in response to a response message for the check indicating that a network capability of the LTE network does not support the preferred mode; and maintain the preferred mode in advance when needing to perform the VoLTE call handover operation in response to a response message for the check indicating that the network capability of the LTE network supports the preferred mode; and initiate the VoLTE call handover operation to handover the VoLTE call to the non-LTE network based on the preferred mode.

14. The non-transitory computer readable medium of claim 13, wherein:

the preferred mode is a single radio voice call continuity (SRVCC) preferred mode;

the non-LTE network is a circuit switched (CS) network; and the non-transitory computer readable medium further comprises program code, that when executed by the at least one processor, causes the at least one processor to:

measure a signal strength of the LTE network and CS network; and transmit, to the LTE network, a predicted measurement report based on the measured signal strength of the LTE network and the CS network for triggering the VoLTE call handover operation to the CS network, wherein the predicted measurement report is transmitted when the signal strength of the LTE network is equal to threshold plus a delta; and receive, from the LTE network, a response message corresponding to the predicted measurement report, wherein the response message indicates whether the LTE and CS networks are capable of supporting the SRVCC preferred mode.

15. The non-transitory computer readable medium of claim 13, wherein:

the preferred mode is an enhanced packet data gateway (ePDG) preferred mode;

the non-LTE network is a WiFi network; and the non-transitory computer readable medium further comprises program code, that when executed by the at least one processor, causes the at least one processor to:

measure a signal strength of the LTE network and WiFi network; and transmit, to the LTE network, a predicted measurement report based on the measured signal strength of the LTE network and the WiFi network for triggering the VoLTE call handover operation to the WiFi network, wherein the predicted measurement report is transmitted when the signal strength of the LTE network is equal to threshold plus a delta; and receive, from the LTE network, a response message corresponding to the predicted measurement report, wherein the response message indicates whether the LTE and WiFi networks are capable of supporting the ePDG preferred mode.

16. The non-transitory computer readable medium of claim 14, further comprising program code, that when executed by the at least one processor, causes the at least one processor to change the SRVCC preferred mode to an enhanced packet data gateway (ePDG) mode based on a network capability of the LTE network when the network capability of the LTE network does not support the SRVCC preferred mode for the VoLTE call handover operation.

17. The non-transitory computer readable medium of claim 13, further comprising program code, that when executed by the at least one processor, causes the at least one processor to:

configure at least one threshold for the VoLTE call handover operation from the LTE network to the non-LTE network; and adaptively adjust the at least one threshold in response to a response message indicating a network capability of the LTE network.

* * * * *